United States Patent [19]
Gacs et al.

[11] 3,793,662
[45] Feb. 26, 1974

[54] AIRCRAFT LOADING BRIDGE

[75] Inventors: Peter T. Gacs, Palos Verdes Peninsula; Lucien C. Williams, Palos Verdes Estates, both of Calif.

[73] Assignee: Foremark Corporation, Gardena, Calif.

[22] Filed: Mar. 1, 1972

[21] Appl. No.: 230,829

[52] U.S. Cl. .................................................. 14/71
[51] Int. Cl. ............................................ B65g 11/00
[58] Field of Search ................................. 14/71, 72

[56] References Cited
UNITED STATES PATENTS

| | | | |
|---|---|---|---|
| 2,875,457 | 3/1959 | Read | 14/71 |
| 3,538,529 | 11/1970 | Breier | 14/71 |
| 3,391,416 | 7/1968 | Riggles | 14/71 |
| 2,688,761 | 9/1954 | Good | 14/71 |
| 3,524,207 | 8/1970 | Giarretto | 14/71 |
| 3,110,048 | 11/1963 | Bolton | 14/71 |
| 3,378,868 | 4/1968 | Wollard | 14/71 |
| 3,099,847 | 8/1963 | Lodjic | 14/71 |
| 3,377,638 | 4/1968 | Seipos | 14/71 |
| 3,462,785 | 8/1969 | Seipos | 14/71 |
| 3,358,308 | 12/1967 | Henchbarger | 14/71 |

Primary Examiner—Nile C. Byers, Jr.

[57] ABSTRACT

An aircraft loading bridge can be constructed utilizing two tunnel sections, the first of which extends from a terminal to a first vertically movable vestibule, the second tunnel extends between the first vestibule and a second vertically movable vestibule. Means are provided on these vestibules for gaining access to an aircraft. By regulating the height of the vestibule the complete bridge can be used to accomodate various different aircraft without making the slope of the tunner sections undesirably steep. If desired, a first tunnel section and an associated vestibule may be initially installed at a terminal and then subsequently a second tunnel section and a vestibule may be added to the already existing structure.

12 Claims, 8 Drawing Figures

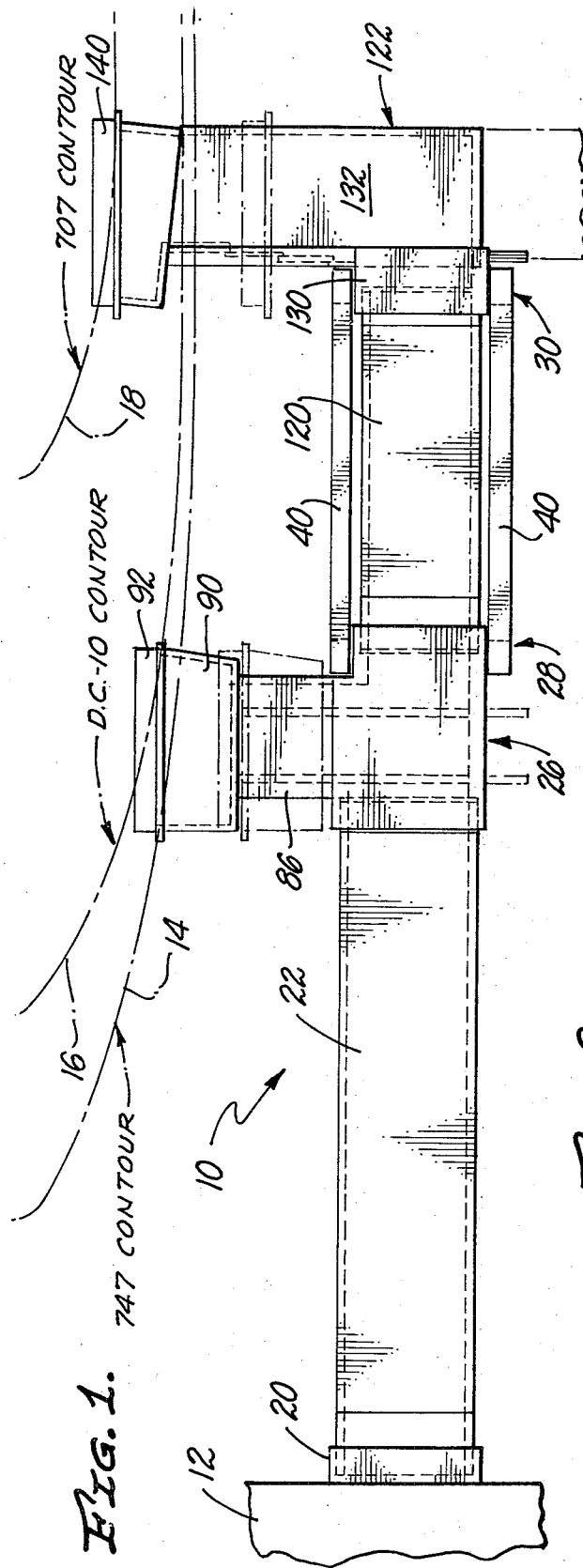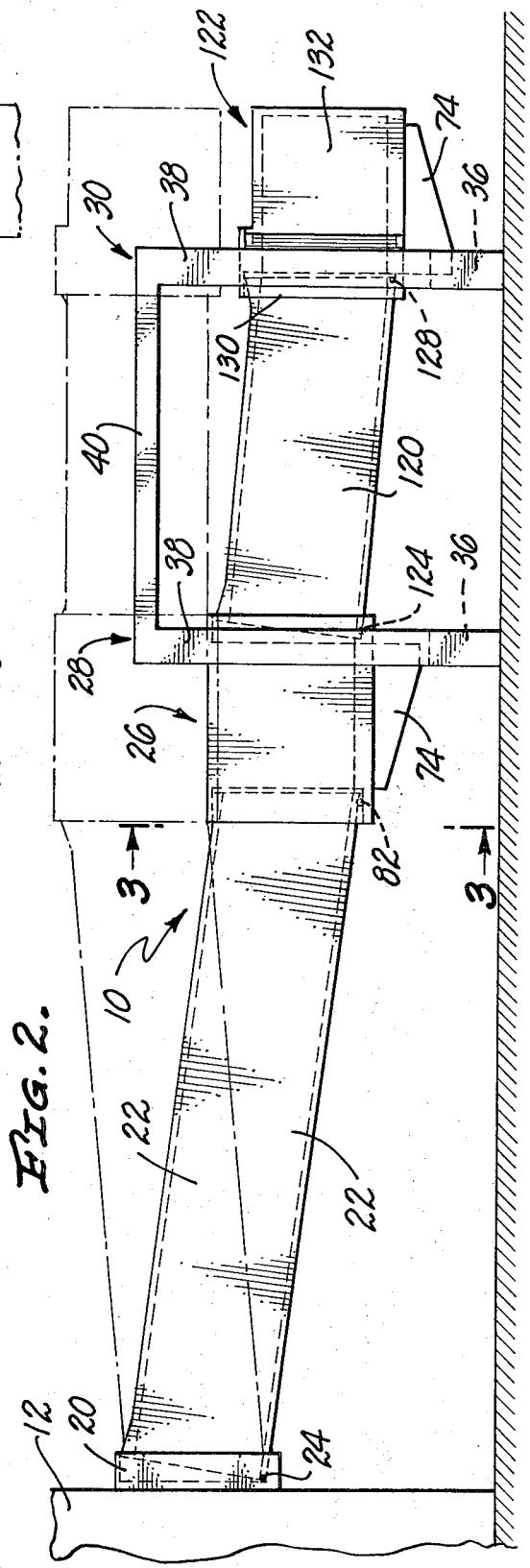

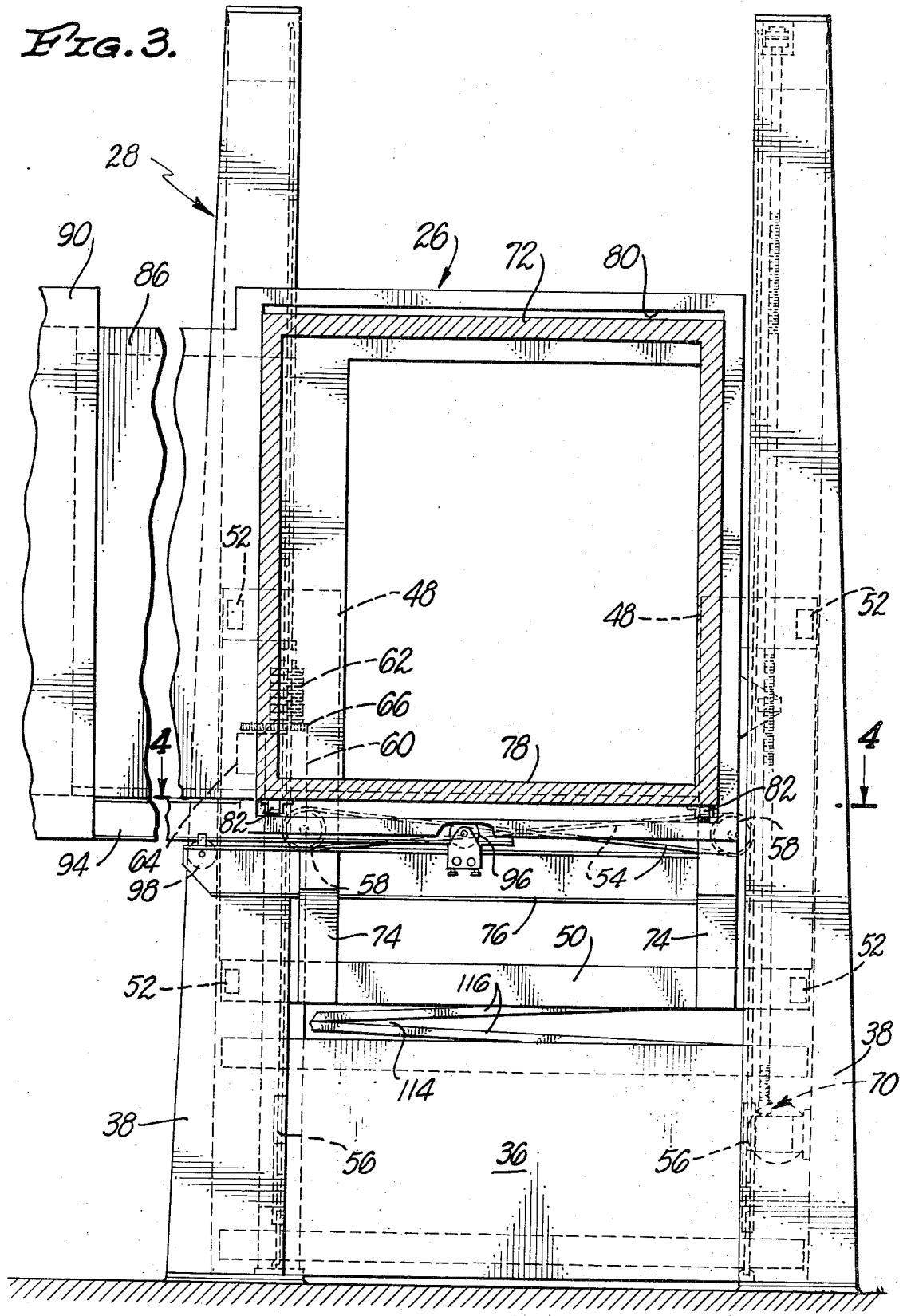

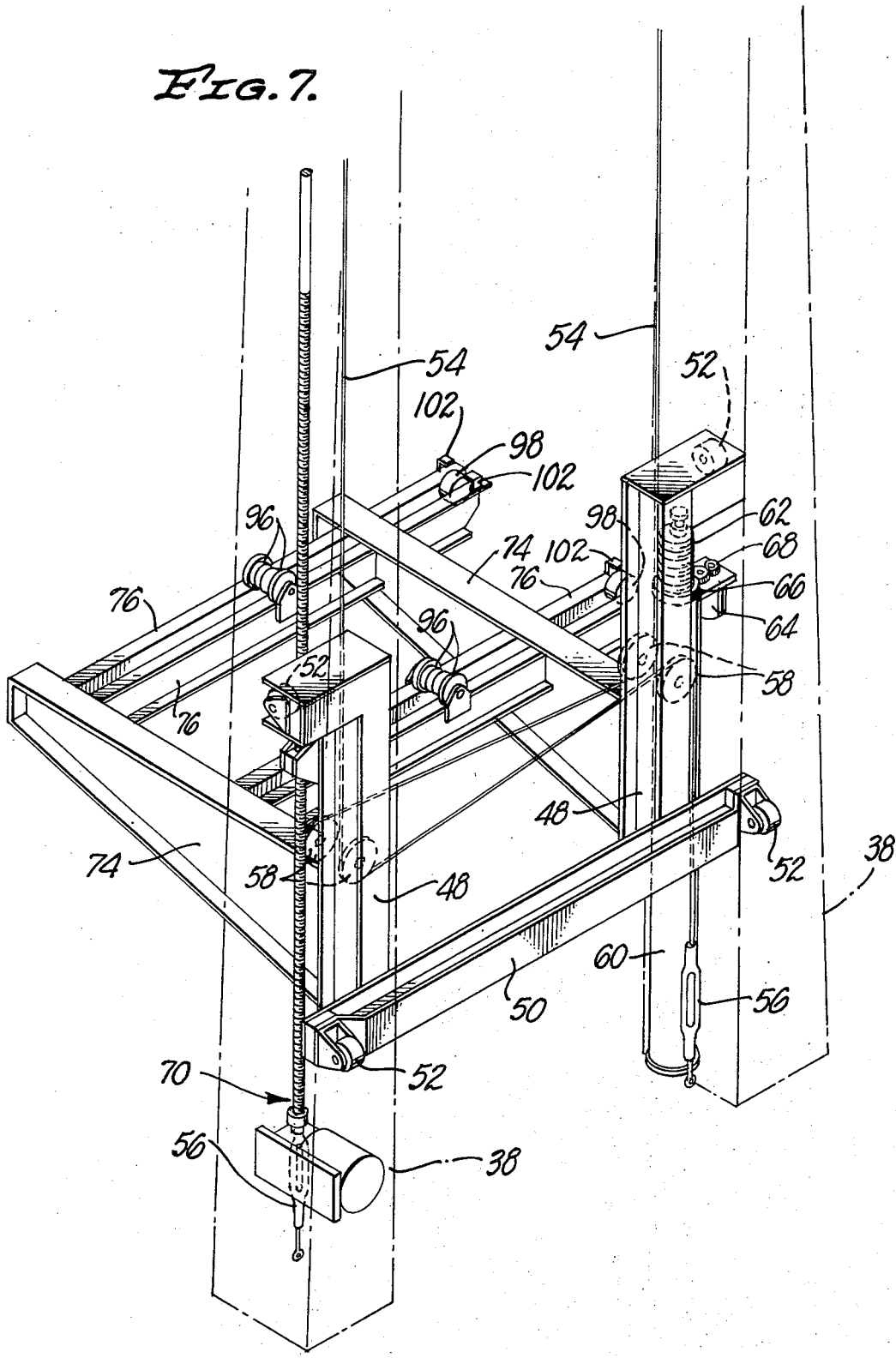

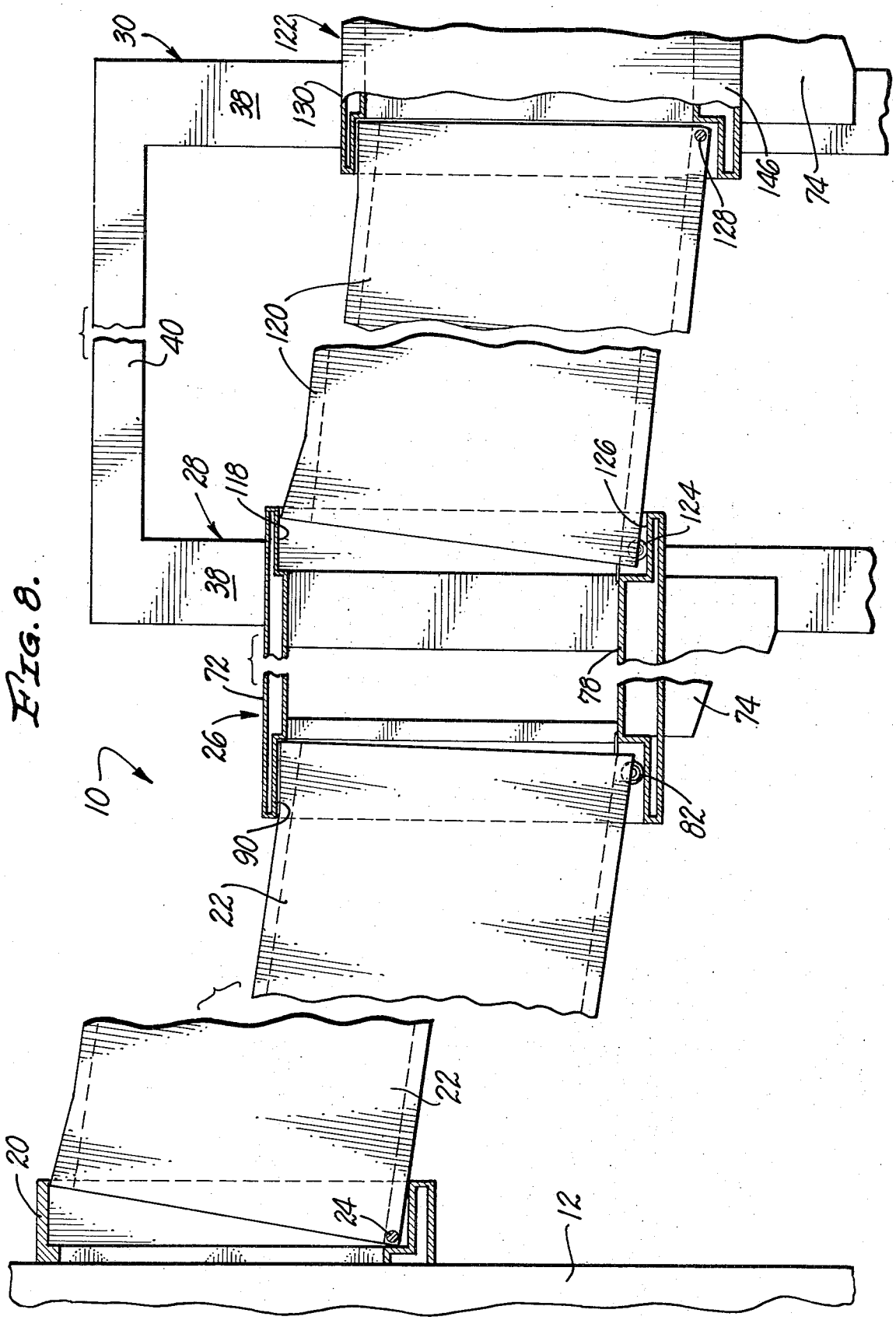

AIRCRAFT LOADING BRIDGE

BACKGROUND OF THE INVENTION

The invention set forth in this specification pertains to aircraft loading bridges. Such bridges are utilized in providing access between an aircraft terminal such as an aircraft passenger terminal in an airport and an aircraft. A large numer of different types of loading bridges are known. Aircraft loading bridges of various different manners of operation are commonly used at airports throughout the world.

The field of aircraft loading bridges has gradually developed so as to keep pace with the developments in aircraft. As such developments have occurred successively larger aircraft have been created and utilized. As this has occurred different types of loading bridges have been developed for use with one or more types of aircraft and for use with aircraft parked in various manners with respect to a terminal. An understanding of the present invention does not require a detailed consideration of these prior bridges and the manners in which they are and have been used.

The comparatively recent advent of comparatively large aircraft such as the Boeing 747, the Douglas DC 10 and the Lockheed L-1011 planes have made many of the existing aircraft loading bridges archaic in the sense that many of them cannot be satisfactorily used with these aircraft. An airline utilizing aircraft of the sizes of these aircraft is normally at something of a disadvantage in attempting to utilize bridges which are specifically designed and constructed for use with these large aircraft because as a general rule, such loading bridges are not readily adaptable to use with both such larger aircraft and such other smaller aircraft as are normally operated by an airline.

As a result of these factors there is a need for new and improved loading bridges which will accomodate various aircraft of different sizes. To a large extent this need is related to economic considerations since the costs of a loading bridge, although small in comparison to the cost of an aircraft used for normal commercial purposes, are quite important to an airline. Although an airline can frequently utilize an existing loading bridge or loading bridge system in connection with both large and small commercial aircraft, it may not desire to do this because of the costs involved with such a bridge or bridge system.

This corelation between economic considerations and the utilitarian desirability of loading bridges is much more extensive and involved than the preceding discussion would indicate. It is also related to the matter of passenger convenience and safety. To be acceptable for passenger utilization a loading bridge must accomodate various types of aircraft in such a way that the slope of the bridge is never undesirably steep. Further the distance a passenger must walk in the bridge should be minimized in order to minimize passenger annoyance and inconvenience.

The economic considerations relating to loading bridge utilization also relates to the volume or amount of use a bridge will receive. Frequently, an airport where a bridge is to be installed will only handle a limited number of passengers, but an airline will want to make provisions for a subsequent increase in passenger volume in such a terminal. Existing bridges are relatively undesirable for use in such circumstances because they are essentially of a fixed capacity type. In other words, they cannot be conveniently modified or altered so as to handle an increased passenger load beyond their initially rated capacity.

In considering what makes a loading bridge acceptable commercially, it is also necessary to consider reliability and simplicity of operation. No airline intentionally will utilize a loading bridge which is difficult to operate. Neither will any airline intentionally acquire a bridge which would appear to be constructed in such a manner as to require extensive maintenance in order to keep it in good operating condition. After all, aircraft loading bridges are only secondary pieces of equipment necessary for an airline to adequately accomplish its primary functions.

BRIEF SUMMARY OF THE INVENTION

A broad objective of the present invention is to provide new and improved aircraft loading bridges which overcome various disadvantages and limitations of various prior related structures such as are indicated in a cursory manner in the preceding discussion. More specifically, the invention is intended to provide new and improved loading bridges which will accommodate aircraft of different sizes. The invention is also intended to provide bridges which will accommodate such various types of aircraft in such a way that the slope of a bridge is never undesirably steep and in such a way to minimize the walkway distance in such a bridge.

An objective of the invention is also to provide new and improved aircraft loading bridges of what may be considered a "modular" construction in that such bridges are composed of a series of individual units such as tunnel sections. These bridges are intended to fulfill a need for passenger loading bridges which, when installed, are of a certain capacity, but which are capable of being expanded as the need may arise so as to have an increased capacity. An intention of the present invention is to provide bridges of this type which may be constructed utilizing a limited number of the "modules" employed and which can be subsequently expanded in capacity by adding additional modules.

Broad objectives of ths invention are also to provide aircraft loading bridges of both such a relatively small initial capacity and of such an additional capacity which are extremely reliable in operation. A further objective of the invention is to provide bridges of these types which are relatively simple to operate. These factors are also related to another objective of the invention which is quite important from an economic standpoint. This broad objective of the invention is to provide bridges as described which may be easily and conveniently constructed at a comparatively nominal cost with a minimum of difficulty.

Because of the natures of the various different objectives of this invention as indicated in the preceding discussion, it is impossible to completely indicate in a summary all of the features and aspects of this invention. When a bridge of this invention is constructed with the thought of subsequently expanding such a bridge, it is constructed with a first support structure, a first vestibule mounted on the first support structure so as to be capable of vertical movement on this first support structure and a tunnel or tunnel section utilized so as to connect the first vestibule with a terminal or an appropriate support at the terminal.

When such a bridge is to be expanded, a second support structure may be located further from the terminal than the first, a second vestibule is mounted on the second support structure for vertical movement on this second support section and another tunnel or tunnel section is utilized so as to connect the two vestibules. Obviously such a complete structure can be constructed at once, if a full size or complete loading bridge in accordance with this invention is needed by an airline. With a bridge of the present invention access is gained to an aircraft through what may be referred to as entrance ways located on the vestibules. As will be subsequently explained a vestibule in accordance with this invention may be movable so that the entrance way moves with it or the entrance way may be movably mounted on a vestibule.

It is considered that an important aspect of this invention also relates to constructional details utilized with the invention. In particular, it is considered that a vertical support structure in accordance with this invention preferably should be constructed so as to utilize parallel columns spaced so as to be capable of having a tunnel or tunnel section positioned so as to be directed generally between the columns or actually positioned between the columns. Further, a vestibule used with such a support structure should be supported upon rail means secured to or forming a part of the columns and means for moving the vestibule should be used in connecting the vestibule with the support structure. Preferably such a support structure includes stabilizing means preventing tilting or cocking of a vestibule connecting the vestibule and the support structure.

BRIEF DESCRIPTION OF THE DRAWINGS

Further details of the invention as well as many advantages of it will appear from a careful consideration of the remainder of this specification, the appended claims and the accompanying drawings in which:

FIG. 1 is a top plan view of a presently preferred embodiment or form of a complete aircraft loading bridge in accordance with this invention showing this bridge in use in connecting an aircraft terminal with aircraft hulls of different contours;

FIG. 2 is a side elevational view of this bridge;

FIG. 3 is a partial cross-sectional view taken at line 3—3 of FIG. 2;

FIG. 7 is an isometric view showing the construction of a part of a vestibule as used in the previously illustrated bridge and indicating the stabilizing means used with such parts; and FIG. 8 is a diagrammatic exploded view, partially in section, corresponding to FIG. 2.

Figure 4:
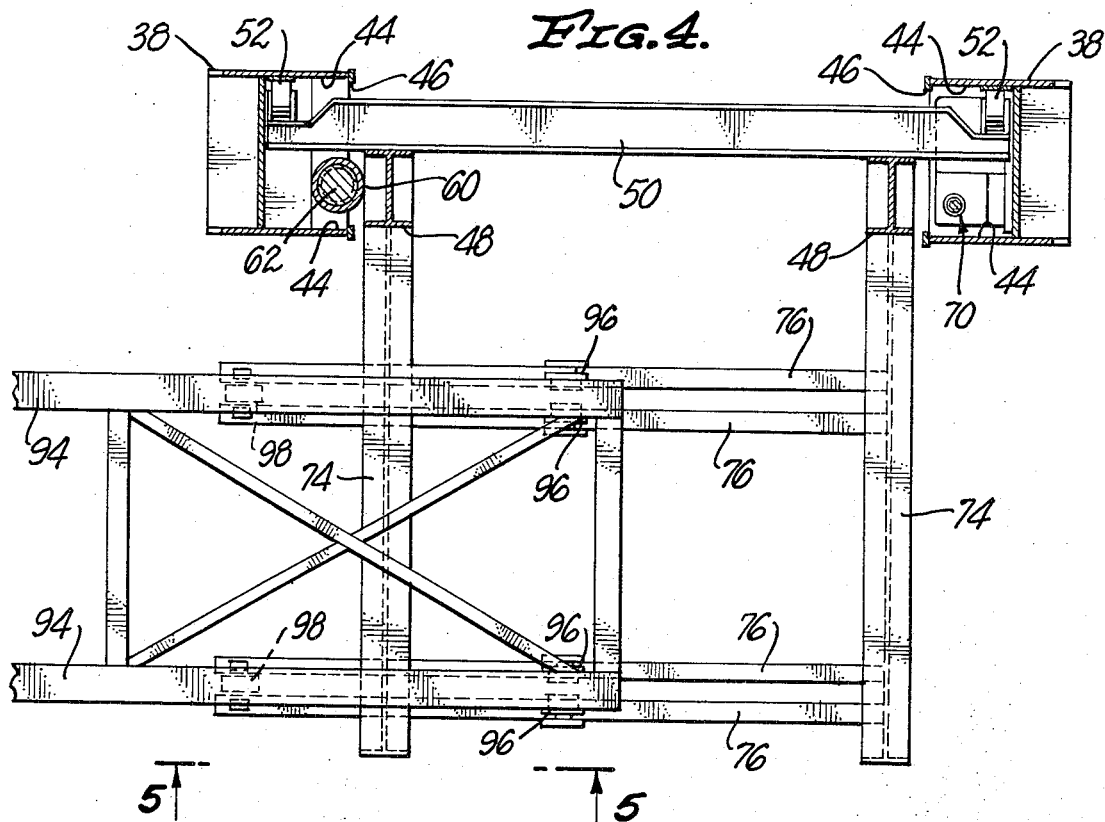
FIG. 4 is a partial cross-sectional view taken at line 4—4 of FIG. 3.

It is to be realized that the illustrated loading bridge is only a particular structure embodying or employing the concepts of the invention set forth in the appended claims forming a part of this specification. These concepts are of an intangible nature and may be utilized in a number of differently designed and differently appearing loading bridges through the use or exercise of routine engineering skill or ability. Further, those concepts fully defined in certain of the appended claims may be utilized without utilizing those concepts separately defined in other of the noted claims.

DETAILED DESCRIPTION OF THE PREFERRED EMBODIMENT

In the drawings there is shown a "complete" or "full capacity" loading bridge 10 in accordance with this invention which is utilized in providing access between an aircraft terminal 12 and the hulls or fusilages 14, 16 and 18 of any of a plurality of different sizes of aircraft. This bridge 10 includes what may be referred to as a terminal support 20 of a generally rectilinear short, tunnel-like shape. This support 20 is directly mounted upon the terminal 12 so as to extend a short distance from it.

The support 20 is primarily intended to be used as a coupler in providing enclosed access from the terminal 12 to an elongated tunnel or tunnel section 22. This tunnel section 22 is of a generally, rectilinear box-like shape and is mounted on the support 20 by means of a conventional pivot 24 so that it can be rotated relative to the terminal 12 and the support 20 at various different angles as may be achieved through the location of a first vestibule 26.

This first vestibule 26 is mounted upon a first support structure 28 so as to be capable of being moved vertically by means as hereinafter indicated. The first vertical support structure 28 is identically constructed to a second vertical support structure 30 used on the side of the first support structure 28 remote from the terminal 12. For convenience of explanation only the first support structure 28 is described in detail in this specification. It is to be understood that the structure of the second support structure 30 is identical to that of the first support structure 28.

This first support structure 28 includes a base 36 serving to connect and hold upright two parallel rigid columns 38. The tops of opposed columns 38 on the support structures 28 and 30 are connected by cross beams 40 which serve to stabilize these support structures 28 and 30 against undesired movement. Each of the columns 38 includes two internal parallel rails 44 defined by the materials in these columns. It will be noted that these rails 44 in each of the columns 38 are spaced by openings 46 in the columns.

These openings 46 are intended to accommodate vertically extending frame members 48 forming a part of the first vestibule 26 in the described structure. These frame members 48 are connected by a rigidly extending cross member 50; they carry opposed rollers 52 at their upper and lower extremities in a position so that these rollers 52 will ride against the rail 44 so that the vestibule 26 may be moved vertically.

To guard against undesired tilting or cocking of the vestibule 26 which might interfere with its intended vertical movement the illustrated structure contains what may be referred to as stabilizing means connecting the vestibule 26 and the first support structure 28. In the disclosed structure such stabilizing means consist of two cables 54, each of which is connected directly to the top of one of the columns 38 and each of which is connected to the bottom of the other of the columns 38 by means of a turn buckle 56.

The stabilizing structure also includes four wheels 58 in the nature of pulleys rotatably mounted on the frame members 48 so that two of the wheels 58 are located adjacent to and are associated with each of the columns 38. The cables 54 are passed around these wheels 58 so that each of the cables 54 first passes around one of the wheels 58 associated with one of the columns 38 and then around one of the wheels 58 associated with the other of the columns 38.

Preferably these wheels 58 are located as shown so that the ends of the cables 54 extend parallel to the columns 38 and so that the cables 54 extend nearly perpendicular to the columns 38. When the cables 54 are held under tension through proper adjustment of the turnbuckles 56 this described structure holds the vestibule 26 so that it can only be moved to successive parallel positions through the use of an appropriate means for moving this vestibule 26.

In the initially preferred structure in accordance with this invention such means included a known, commercially available hydraulic cylinder 60 utilized to operate and turn a screw-like ram 62 serving as a piston rod. A small hydraulic motor 64 was mounted on the cylinder 60 adjacent to this ram 62 so as to turn a nut 66 on the ram 62 in synchronism with the movement of the ram 62 through the use of a gear train drive 68. This structure was intended to provide a safety feature so that if for any reason the cylinder 60 would not support the ram 62 in a desired position by abutting against one of the frame members 48 the nut 66 would abut against the end of the cylinder 60 to block downward movement of the ram 62. This action would be achieved since in the event of such failure the motor 64 would not operate to turn the nut 66 so as to permit downward travel of the ram 64.

This particular means for moving the vestibule 26 up and down is considered to have distinct advantages by providing a measure of safety as described for the complete bridge 10. On many occasions it is considered that airlines will not desire the structure involving the cylinder 60, the ram 62, the motor 64 and the nut 66 because of the complexity of this structure and the manner in which this structure operates. It is possible to replace this structure in the bridge 10 by a directly operating conventional hydraulic lift or a conventional operating ball screw 70 associated, like the moving structure described, with one of the columns 38 so as to connect it with the vestibule 26.

One advantage of the structure of the vestibule 26 and the associated support structure 28 is considered to be that with this structure only part of the vestibule 26 and one of the columns 38 is adequate to cause movement of the vestibule 26 without shifting or cocking which would tend to interfere with such movement.

When the vestibule 26 is moved vertically through the operation of a moving means as indicated, a box-like central portion 72 of this vestibule 26 attached to the frame members 48 is moved up and down in synchronism with parallel cantilever beams 74 which are secured to crosswise extending rails 76 located immediately beneath, but spaced from the floor 78 of the central portion 72.

This central portion 72 includes an inlet opening 80 into which the tunnel section 22 projects. This tunnel section 22 carries at its ends within the opening 80 small rollers 82 which ride against surfaces 84 disposed at the sides of the opening 80. This central portion 72 also includes a side passage extending at a right-angle to the tunnel section 22.

The extremity 88 of the passage 86 is completely surrounded by what may be referred to as a rectilinear hood 90 which is spaced from the passage 86 a small distance in such a manner that it may be moved forward and backward relative to the passage 86. In effect this hood 90 constitutes an extension of the passage 86 used to surround a part of the passage 86. This hood 90 includes a separate floor (not shown) which, when it is moved, moves parallel to the floor 78 so as to in effect constitute an extension of it.

THe hood 90 also includes a conventional or other canopy 92 designed to fit against an aircraft hull such as the hulls 14 or 16 in order to form a seal relative to such a hull about a door leading into an aircraft. In effect, this structure of the passage 86 and the hood 90 defines an entrance way for use in gaining access to an aircraft which is movable both relative to the central portion 72 of the first vestibule 26 and relative to the first support structure 28 and the tunnel section 22.

Within the disclosed structure such movement is accomplished through the use of parallel beams 94 attached to the bottom of the hood 90 so as to extend under the floor 78 adjacent to the rails 76. These beams 94 are carried upon a first pair of rollers 96 and a second pair of rollers 98 which are located on these rails 76 in such a manner that they (and the hood 90) can be moved back and forth along the rails 76. It will be noted that these rollers 96 and 98 in the disclosed structure fit over and under flanges 100 on the beams 94 so as to hold the beams 94 horizontally. Preferably the rollers 98 which fit under these flanges 100 are utilized in connection with small upstanding L-shaped members 102 which extend from the rails 76 above the flanges 100.

In the preferred structure of this invention one of the beams 94 carries a drive chain 104 so that its ends 106 are secured to this particular beam 94. Intermediate the ends 106 the chain 104 passes over idler sprockets 108 attached to the floor 78. In between these idler sprockets 108 this chain 104 also passes over a drive sprocket 110 secured so as to be driven by a conventional drive motor 112. This drive motor 112 is mounted on the floot 78; it is adapted to be supplied with power through cables 114 carried by conventional folding cable supports 116. When the motor 112 is operated by rotating the sprocket 110 it causes the beams 94 (and the hood 90) to be moved relative to the central portion 72.

The vestibule 26 also includes what may be referred to as an outlet 118 which is in alignment with the tunnel section 22 and the opening 80. It will be noted that this opening 118 is generally between the columns 38 of the first support structure 28. The central portion 72 of the vestibule 26 is preferably constructed initially so that this outlet opening 118 either is or can be easily closed off so that the entire structure of the bridge described to this point in this portion of the specification can be utilized as a bridge unit consisting of the "modules'-'—the tunnel section 22, the first vestibule 26 and the first support structure 28 as described in detail. On occasion an airline may desire to utilize such as "shortened" bridge in circumstances where it may be desired to increase the capacity of the bridge or the utilization of the bridge at a latter date by adding to it a second tunnel section 120, the second support structure 30 and a second vestibule 122.

This second tunnel section 120 extends into the opening 118 in the same manner in which the tunnel section 22 extends into the opening 80. Within the opening 118 the tunnel section 120 is supported upon small rollers 124 riding upon bottom surfaces 126 located generally at the sides of the opening 118. The tunnel section 120 is also supported by means of a pivot 128 corresponding to the pivot 24 previously described. This pivot 128 is, however, mounted upon a small rectilinear coupler section 130 appearing as an extension of the tunnel section 120, but in reality forming a part of the second vestibule 122.

This second vestibule 122 is constructed in a manner which is similar to the construction of the vestibule 26 in that it utilizes frame members 48, cross members 50, rollers 52, beams 74, rails 76 and other rollers 96 and 98 all as previously described. It will be realized that the frame members 48 engage the columns 38 of the second support structure 30 in the same manner with both the first and the second vestibules 26 and 122. Further, stabilizing means as described in the preceding including the cables 54, the turnbuckles 56 and the wheels 58 are used in connection with connecting the second vestibule 122 to the second support structure 30 in a manner as previously described.

Figure 6:
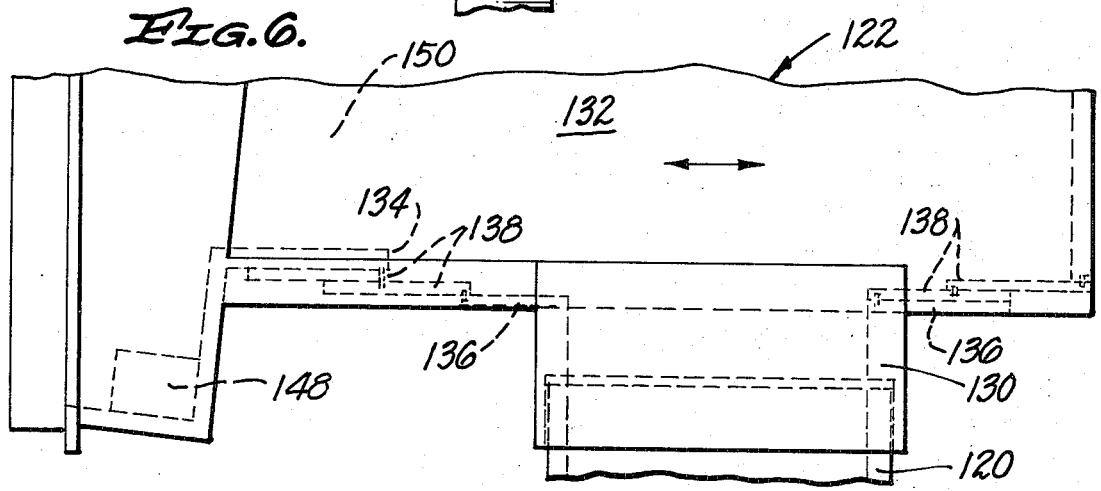
FIG. 6 is an enlarged partial top plan view corresponding to a part of a view taken at line 6—6 of FIG. 1.

In the case of the second vestibule 122, however, the coupler section 130 is directly attached to the frame members 48 and the wheels 58 are directly connected to this coupler section 130. The principal or central portion 132 of the second vestibule 122 is a generally box-like structure having an elongated opening 134 located in the side adjacent to the coupler section 130. This coupler section 130 extends into this opening 134 as shown in FIG. 6.

Within this opening 134 this coupler section 130 carries side panels 136 which extend from it so as to fit against sliding closure panels 138 mounted in a conventional manner so as to be capable of being slid with respect to one another so as to completely close off the opening 134 as the central portion 132 of the second vestibule 122 is moved so that this second vestibule 122 extends at various distances from the same side of the tunnel section 120 as the first vestibule 26. Since panels such as the panels 136 are commonly utilized in the aircraft loading bridge field as, for example, in rotating cabs on telescopic loading bridges they and the manner in which they are mounted are not described in detail herein in the interest of brevity.

Figure 5:
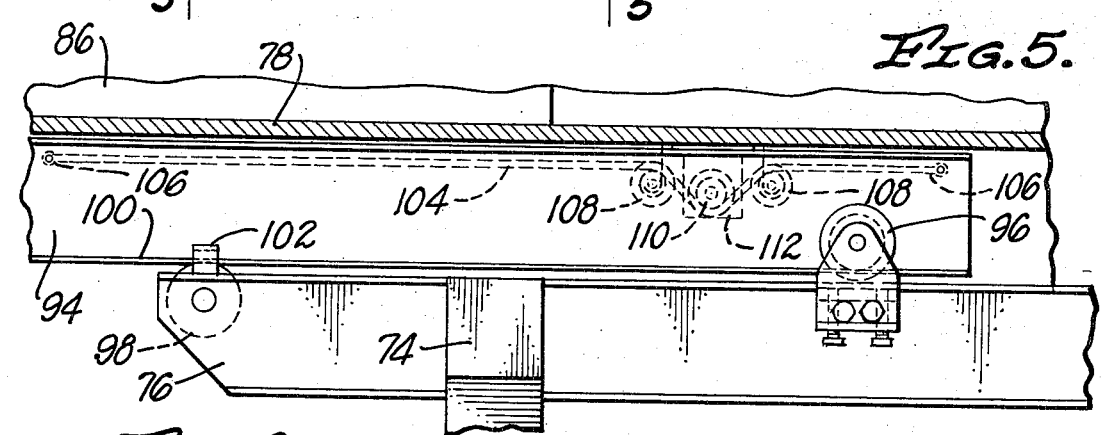
FIG. 5 is a partial cross-sectional view taken at line 5—5 of FIG. 4.

The second vestibule 122 is also very similar to the first vestibule 26 in that underneath the floor of the central portion 132 there are located beams corresponding to the beams 94. These beams are, however, secured to the floor of the central portion 132 so that the entire central portion 132 of the vestibule 122 can be moved as a unit so as to place a conventional or other canopy 140 in contact with an aircraft hull such as the hull 18 previously described. Such movement is preferably achieved through the use of a drive chain corresponding to the chain 104 having its ends secured to the floor 140 and passing over idler and drive sprockets corresponding to the sprockets 108 and 110 mounted on the bottom 146 of the coupler section 130. Preferably a drive motor such as the motor 112 is also found on the bottom of the central portion 132 for the purpose of driving this drive sprocket. This structure involving the floor of the central portion 132, the beams 142 and the drive chain and associated parts or components is not specifically illustrated in the drawings since it is essentially identical to the structure shown in FIG. 5 except for the fact that the beams are secured to the floor 140 whereas in the structure shown in FIG. 5 the beams 94 are merely positioned next to the floor 78 so that they can move with respect to the floor 78.

In the aircraft loading bridge 10 disclosed herein an appropriate control mechanism 148 of a conventional design may be mounted in a passage way portion 150 of the second vestibule 122 so that a single operator can be utilized to control the operation of the complete bridge even when the bridge is utilized with aircraft having two different separate doors being serviced by this bridge. No effort is made herein to describe the control mechanism 148 since it is of an obvious conventional design. This control mechanism 148 is intended to accomplish four different, separate control functions.

By regulating the operation of means as described for vertically raising or lowering the vestibules 26 and 122 relative to the support structures 28 and 30, respectively, either or both of these vestibules 26 and 122 may be located directly opposite a door on an aircraft hull, such as the hulls 14, 16 and 18 indicated in the preceding. In addition, the control mechanism 148 can be utilized so as to extend the hood 90 and the canopy 92 from the first vestibule 26 so that in effect the extremity of this first vestibule 26 serves as or defines an entrance way used in gaining access to an aircraft. In a similar manner the control mechanism 148 can be utilized so as to in effect move the entire vestibule 122 except for the coupler section 130 as a complete unit so that the extremity of this second vestibule 122 serves as a similar entrance way.

It is believed that the utility of the described structure in accommodating various different aircraft at various different levels to the ground will be obvious from this discussion. It is important to note that the complete bridge 10 is useable in accommodating such aircraft without the slope of the tunnel sections 22 and 120 becoming undesirably steep or long for passenger safety and convenience. In effect, these tunnel sections constitute a complete tunnel in the bridge 10 when they are utilized with the vestibules 26 and 122 as described.

The second tunnel section 120, the second vestibule 122 and the second support structure 30 can all be considered as separate "modules" capable of being added to a bridge consisting of other modules—more specifically the vestibule 26, the first tunnel section 22 and the first support structure 28—after a bridge consisting of the latter has been built and placed in operation. This is considered to be particularly desirable in these instances where a "low capacity" bridge is desired, but where a "high capacity" bridge may ultimately be needed.

The entire bridge 10 has been designed for simplicity of construction and operation as well as for utilitarian purposes giving it utilities not found in other closely related bridges. In this connection it will be noted that the support structures 28 and 30 are identically constructed and that the vestibules 26 and 122 utilize many parts which are identical. Such utilization of these and other parts of the bridge 10 in different portions of the bridge 10 is considered to decrease the engineering costs involved in building a bridge such as the bridge 10.

Also, the moving mechanisms used in connection with the bridge 10 are essentially very similar, are relatively inexpensive and require little or no maintenance, or essentially minimal maintenance. This is considered to be desirable in an economic sense, both to a manufacturer and to an ultimate user of a bridge such as the bridge 10.

We claim:

1. An aircraft loading bridge for use in providing access between an aircraft terminal and an aircraft, said bridge having a terminal support, a tunnel extending from said terminal support, and entrance way means to be used in gaining access to an aircraft located at the extremity of said tunnel remote from said terminal support, in which the improvement comprises:

a first vestibule support structure being located adjacent to said tunnel between the ends thereof, a second vestibule support structure located adjacent to said tunnel at the end thereof remote from said terminal support, said first and second vestibule support structures being incapable of being moved relative to one another and said terminal support, a first vestibule movably mounted on said first support structure so as to be capable of being vertically moved on said first support structure, a second vestibule movably mounted on said second support structure so as to be capable of being vertically moved on said second support structure, said tunnel including an inner tunnel section and an outer tunnel section, said terminal support, said first and second vestibules and said tunnel sections being aligned with one another, said inner tunnel section extending between said terminal support and said first vestibule, said inner tunnel section being supported by said terminal support and said first vestibule so as to be capable of extending at various angles to the horizontal which are determined by the relative vertical position of said first vestibule with respect to said terminal support, said outer tunnel section extending between said first vestibule and said second vestibule, said outer tunnel section being supported by said first and said second vestibules so as to be capable of extending at various angles to the horizontal which are determined by the relative vertical positions of said first and said second vestibules, said entrance way means comprising a first entrance way on said first vestibule and a second entrance way on said second vestibule, said entrance ways being separately movable with respect to the vestibule support structures upon which they are located and being located on the same side of said tunnel sections so as to be capable of projecting from said tunnel sections different amounts to fit against different portions of different aircraft hulls and hulls in different locations relative to said bridge.

2. An aircraft loading bridge as claimed in claim 1 wherein:

said first vestibule is mounted on the support structure upon which it is located so that it is incapable of being moved horizontally relative to said tunnel, the entrance way on said first vestibule is movably mounted on said first vestibule so as to be capable of being moved horizontally relative to said first vestibule, said second vestibule is mounted on the support structure upon which it is located so as to be capable of being moved horizontally relative to said tunnel, said entrance way on said second vestibule is secured to an extremity of said second vestibule so as to be movable with said second vestibule.

3. An aircraft loading bridge as claimed in claim 1 wherein:

each of said support structures includes two rigid columns and rail means mounted on each of said columns for supporting a vestibule, each of said vestibules includes wheels engaging both of the rail means on the support structure upon which it is located so as to be capable of being moved vertically, and including, a means for vertically moving each of said vestibules connecting each of said vestibules with the support structure upon which it is located.

4. An aircraft loading bridge as claimed in claim 3 including:

separate stabilizing means for preventing tilting of said vestibules connecting each of said vestibules with the support structure upon which it is located, each of said stabilizing means includes two cables, each of said cables being connected to the top of one of said support columns of one said support structure and to the bottom of the other of said support column of the same support structure, each of said cables being connected to the top of one of said support columns, said stabilizing means also including four wheels mounted on each of said vestibules, two of said wheels on each vestibule being located adjacent to each of said columns, each of said cables of each of said stabilizing means passing around one of said wheels adjacent to one of said columns and around one of said wheels adjacent to the other of said columns.

5. An aircraft loading bridge as claimed in claim 1 wherein:

each of said support means includes two support columns, and said tunnel extends between said columns.

6. A structure for use in connection with an aircraft loading bridge which comprises:

a vertical support structure including two rigid parallel columns spaced from one another and rail means for supporting the vestibule mounted on each of said columns, a vestibule mounted on both of said rail means so as to be capable of vertical movement relative to said support structure, stabilizing means for preventing tilting of said vestibule on said rail means connecting said vestibule with said support structure, said columns being spaced sufficiently far from one another so that an aircraft loading bridge tunnel may be located between them, said vestibule being capable of supporting an end of an aircraft loading bridge tunnel extending between said column, said stabilizing means including two cables and four wheels, each of said cables being connected to the top of one of said support columns and to the bottom of the other of said support columns, the tops of said cables being connected to different of said support columns, said wheels being mounted on said vestibule, two of said wheels on said vestibule being located adjacent to one of said support columns and the other two of said wheels being located adjacent to the other of said support columns, each of said cables passing around one of said wheels adjacent to one of said columns and around one of said wheels adjacent to the other of said columns.

7. An aircraft loading bridge as claimed in claim 6 wherein:

said vestibule includes a movable tunnel portion, said tunnel portion being movably mounted on said vestibule so as to be capable of being moved to extend from said support structure a desired distance to fit against an aircraft hull.

8. An aircraft loading bridge for use in providing access between an aircraft terminal and an aircraft, said bridge having a terminal support, a tunnel extending from said terminal support, and an entrance way to be used in gaining access to an aircraft located at the extremity of said tunnel remote from said terminal support in which the improvement comprises:

a vertical support structure located adjacent to the end of said tunnel remote from said terminal so as to be incapable of being moved relative to said terminal support, said support structure including two rigid, parallel columns spaced from one another and vertically extending rail means for supporting a vestibule mounted on each of said columns, a horizontally oriented vestibule mounted on both of said rail means so as to be capable of being moved vertically, means for vertically moving said vestibule connecting said vestibule with said support structure, pivot means connecting an end of said tunnel with said terminal support, the end of said tunnel remote from said terminal being carried by a portion of said vestibule so as to be capable of movement relative to said vestibule as said vestibule is moved up and down, said entrance way being located on said vestibule at one side of said tunnel, and being capable of being moved horizontally relative to said vestibule so as to be capable of fitting against different aircraft hulls and aircraft hulls in different positions, and means for moving said entrance way horizontally relative to said vestibule.

9. An aircraft loading bridge as claimed in claim 8 including:

stabilizing means for preventing tilting of said vestibule on said rail means connecting said vestibule with said support structure.

10. An aircraft loading bridge as claimed in claim 9 wherein:

said stabilizing means includes two cables and four wheels, each of said cables being connected to the top of one of said support columns and to the bottom of the other of said support columns, the tops of said cables being connected to different of said support columns, said wheels being mounted on said vestibule, two of said wheels on said vestibule being located adjacent to one of said support columns and the other two of said wheels being located adjacent to the other of said support columns, each of said cables passing around one of said wheels adjacent to one of said columns and around one of said wheels adjacent to the other of said columns.

11. An aircraft loading bridge as claimed in claim 8 wherein:

said vestibule includes an opening means whereby a tunnel section constituting a continuing portion of said tunnel may be supported on said vestibule so as to lead therefrom in the event it is desired to lengthen said aircraft loading bridge beyond its original length.

12. An aircraft loading bridge as claimed in claim 8 including:

stabilizing means for preventing tilting of said vestibule on said rail means connecting said vestibule with said support structure, and wherein, said stabilizing means includes two cables and four wheels, each of said cables being connected to the top of one of said support columns and to the bottom of the other of said support columns, the tops of said cables being connected to different of said support columns, said wheels being mounted on said vestibule, two of said wheels on said vestibule being located adjacent to one of said support columns and the other two of said wheels being located adjacent to the other of said support columns, each of said cables passing around one of said wheels adjacent to one of said columns and around one of said wheels adjacent to the other of said columns, said vestibule includes an opening means whereby a tunnel section constituting a continuing portion of said tunnel may be supported on said vestibule so as to lead therefrom in the event it is desired to lengthen said aircraft loading bridge beyond its original length.

* * * * *